US011561817B2

(12) United States Patent
Miller

(10) Patent No.: US 11,561,817 B2
(45) Date of Patent: *Jan. 24, 2023

(54) HIGH AVAILABILITY FOR VIRTUAL NETWORK FUNCTIONS

(71) Applicant: Ribbon Communications Operating Company, Inc., Westford, MA (US)

(72) Inventor: Paul Miller, Derry, NH (US)

(73) Assignee: GENBAND US LLC, Frisco, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/453,378

(22) Filed: Nov. 3, 2021

(65) Prior Publication Data
US 2022/0058049 A1 Feb. 24, 2022

Related U.S. Application Data

(63) Continuation of application No. 16/827,146, filed on Mar. 23, 2020, now Pat. No. 11,169,840, which is a continuation of application No. 15/331,602, filed on Oct. 21, 2016, now Pat. No. 10,628,195.

(60) Provisional application No. 62/245,083, filed on Oct. 22, 2015.

(51) Int. Cl.
G06F 9/455 (2018.01)

(52) U.S. Cl.
CPC .. G06F 9/45558 (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,594,649 B2 * | 3/2017 | Yang | G06F 11/202 |
| 9,697,028 B1 | 7/2017 | Allen | |
| 9,788,169 B1 | 10/2017 | Miller | |
| 9,979,602 B1 | 5/2018 | Chinnakannan et al. | |
| 10,089,123 B2 | 10/2018 | Chapman | |
| 10,122,610 B2 | 11/2018 | Kumar | |
| 10,255,094 B2 | 4/2019 | Miller | |
| 10,545,778 B1 * | 1/2020 | Venkata | G06F 9/45558 |
| 10,628,195 B2 * | 4/2020 | Miller | H04L 41/0896 |
| 10,628,273 B2 * | 4/2020 | Yoshimura | G06F 9/5077 |

(Continued)

OTHER PUBLICATIONS

Lee et al; "Design of SDN based Large Multi-tenant Data Center Networks"; IEEE 2015; (Lee_2015.pdf; pp. 44-50) (Year: 2015).*

(Continued)

*Primary Examiner* — Hiren P Patel
(74) *Attorney, Agent, or Firm* — Haynes and Boone, LLP

(57) ABSTRACT

A method includes, with a Virtual Network Function (VNF) manager, managing a VNF that includes a plurality of VNF components running on a plurality of virtual machines, the virtual machines running on a plurality of physical computing machines, and with the VNF manager, causing a Network Function Virtualization Infrastructure (NFVI) to have a total number of virtual machines provisioned, the total number being equal to a number of virtual machines capable of providing for a current demand for VNF components plus an additional number of virtual machines equal to the highest number of virtual machines being provided by a single one of the plurality of physical computing machines.

20 Claims, 6 Drawing Sheets

(56) References Cited

U.S. PATENT DOCUMENTS

| | | | |
|---|---|---|---|
| 10,664,297 B2 * | 5/2020 | Bruun | H04L 43/20 |
| 10,768,995 B2 * | 9/2020 | Celozzi | G06F 11/0712 |
| 10,999,147 B2 * | 5/2021 | Celozzi | H04L 41/40 |
| 11,169,840 B2 * | 11/2021 | Miller | H04L 41/0895 |
| 11,223,541 B2 * | 1/2022 | Xia | H04L 41/5096 |
| 2010/0023940 A1 | 1/2010 | Iwamatsu et al. | |
| 2010/0175070 A1 | 7/2010 | Baba | |
| 2012/0151490 A1 | 6/2012 | Zhang et al. | |
| 2012/0331463 A1 | 12/2012 | Orveillon et al. | |
| 2014/0019974 A1 | 1/2014 | Tamura | |
| 2014/0258483 A1 | 9/2014 | Mai et al. | |
| 2014/0344812 A1 | 11/2014 | Abe et al. | |
| 2015/0100960 A1 | 4/2015 | Shigeta | |
| 2016/0057075 A1 | 2/2016 | Parikh et al. | |
| 2016/0103698 A1 | 4/2016 | Yang et al. | |
| 2016/0149771 A1 | 5/2016 | Prasad et al. | |
| 2016/0182567 A1 | 6/2016 | Sood et al. | |
| 2016/0277509 A1 | 9/2016 | Qiang | |
| 2016/0321112 A1 | 11/2016 | Iwashina et al. | |
| 2016/0328258 A1 | 11/2016 | Iwashina et al. | |
| 2016/0335111 A1 * | 11/2016 | Bruun | H04L 41/50 |
| 2017/0078216 A1 | 3/2017 | Adolph et al. | |
| 2017/0104679 A1 | 4/2017 | Sunavala et al. | |
| 2017/0116019 A1 | 4/2017 | Miller | |
| 2017/0150399 A1 | 5/2017 | Kedalagudde et al. | |
| 2017/0192811 A1 | 7/2017 | Kiess et al. | |
| 2017/0257276 A1 | 9/2017 | Chou et al. | |
| 2017/0324612 A1 | 11/2017 | Perez et al. | |
| 2018/0246746 A1 | 8/2018 | Miller et al. | |
| 2018/0309824 A1 | 10/2018 | Gkellas et al. | |
| 2019/0196856 A1 | 6/2019 | Miller | |

OTHER PUBLICATIONS

Scholler et al; "Resilient deployment of virtual network functions"; IEEE 2013; (Scholler_2013.pdf; pp. 208-214) (Year: 2013).*

* cited by examiner

HIGH AVAILABILITY FOR VIRTUAL NETWORK FUNCTIONS

CROSS-REFERENCE TO RELATED APPLICATIONS

This application is a continuation of U.S. patent application Ser. No. 16/827,146 filed Mar. 23, 2020, which is a continuation of U.S. patent application Ser. No. 15/331,602 filed Oct. 21, 2016 issued Apr. 21, 2020 as U.S. Pat. No. 10,628,195, which claims priority to Provisional Application No. 62/245,083, filed Oct. 22, 2015, the disclosures of which are hereby incorporated by reference in the entirety.

BACKGROUND

The present disclosure relates generally to Network Functions Virtualization (NFV), and more particularly to methods and systems for managing networks for elastic Virtual Network Functions (VNFs).

NFV is a concept that involves virtualization of various telecommunication functions that are then interconnected to provide telecommunication services. Particularly, specific telecommunication functions that are typically performed by specialized pieces of hardware are replaced with a virtualization of such hardware. One example of such hardware is a Session Border Controller (SBC). The virtualized functions that would otherwise be performed by such hardware are referred to as Virtual Network Functions (VNFs).

NFV can utilize various computing and networking technologies such as cloud computing and Software-Defined Networking (SDN). Cloud computing typically involves several physical computing systems that, through the use of a hypervisor, present virtual machine environments for use by guest operating systems. The guest operating systems can run applications as a physical computing system does. Applications related to VNFs can be run on such guest operating systems.

SDN is an approach to networking that separates the control plane from the data plane. By contrast, a legacy system may include several independently configured routers, whereas a system implementing SDN may include a central management component that makes decisions as to where traffic should be sent and then directs underlying systems to route network traffic as appropriate. SDN concepts can be used in the physical networks that interconnect the physical computing systems that provide a virtual machine environment.

SUMMARY

According to one example, a method includes, with a Virtual Network Function (VNF) manager, managing a VNF that includes a plurality of VNF components running on a plurality of virtual machines, the virtual machines running on a set of physical machines, determining a first number that is equal to a number of virtual machines capable of providing for a current demand for VNF components, determining a second number that is equal to the highest number of virtual machines being provided by a single one of the set of physical computing machines, and with the VNF manager, causing a Network Function Virtualization Infrastructure (NFVI) to have a total number of virtual machines provisioned, the total number being equal to the first number plus the second number.

According to one example, a system includes a processor and a memory comprising machine readable instructions that when executed by the processor, cause the system to determine a first number that is equal to a number of virtual machines, each virtual machine associated with a Virtual Network Function (VNF) component, that is capable of meeting current demand for the VNF. The system is further to determine a second number that is equal to the largest number of VNF components currently supported by a single physical machine, and cause a total number of virtual machines to be provisioned, the total number being equal to a sum of the first number and the second number.

According to one example, a method includes, with a Virtual Network Function (VNF) manager, causing a plurality of virtual machines to be provisioned on a set of physical machines. The method further includes, with the VNF manager, causing the plurality of virtual machines to each run a VNF component of a VNF, determining a number of virtual machines sufficient to provide for a current demand for telecommunication services provided by the VNF components, causing an additional number of virtual machines to be provisioned based on the highest number of the plurality of virtual machines being supported by a single physical machine, and further adjusting a total number virtual machines that are currently provisioned for the VNF based on a change in the highest number of plurality of virtual machines being supported by a single physical machine.

BRIEF DESCRIPTION OF THE DRAWINGS

Aspects of the present disclosure are best understood from the following detailed description when read with the accompanying figures.

Figure 1:
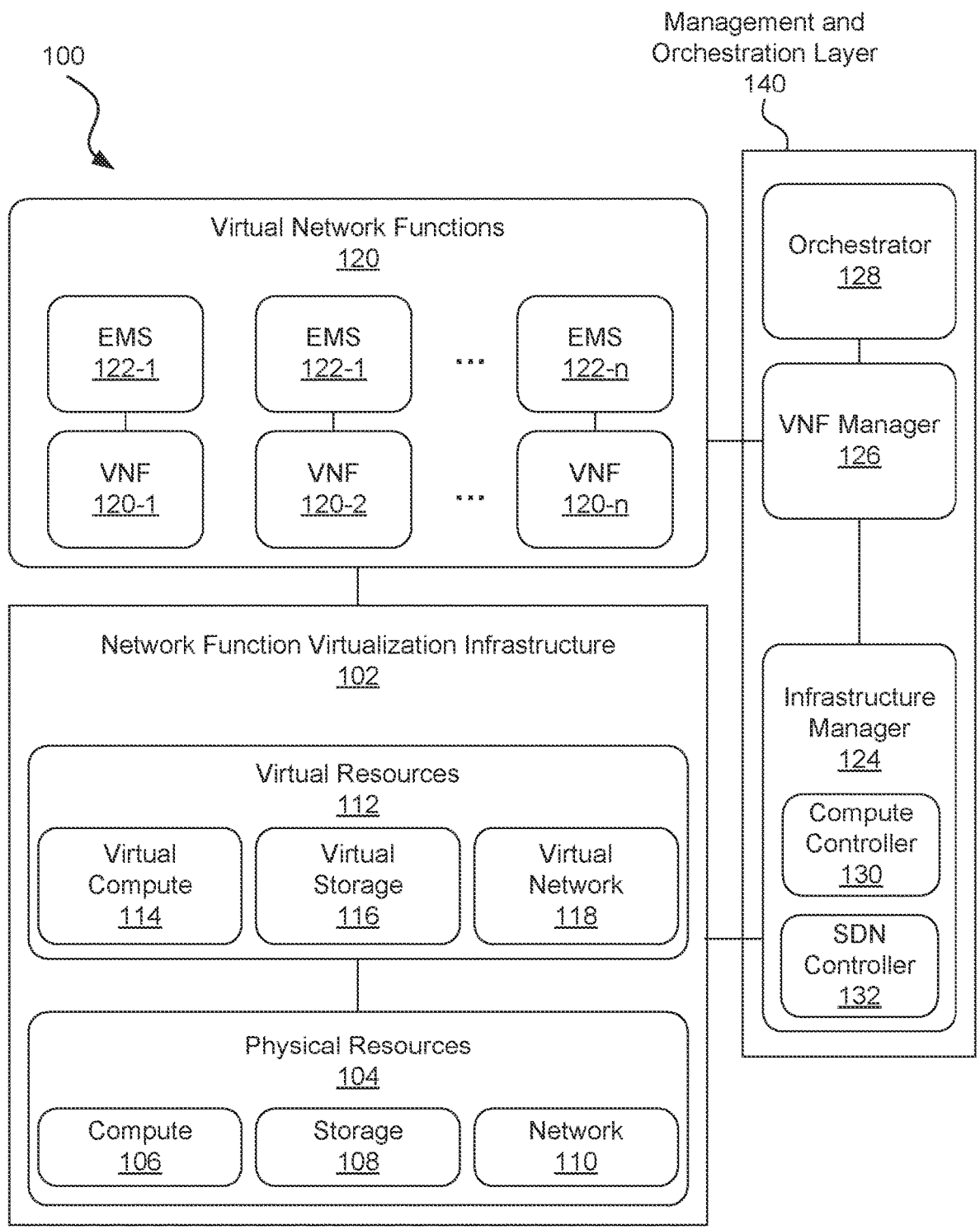
FIG. 1 is a diagram showing network function virtualization, according to one example of principles described herein.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, NFV utilizes several virtual machines in a cloud computing environment to perform telecommunication functions that were previously provided by specialized pieces of hardware. One benefit of NFV is that it provides elasticity. A VNF typically includes several VNF components. In some cases, each VNF component may be running on a different virtual machine. In some cases, some VNF components may be similar instances of the same application. Such instances may handle up to a certain capacity of telecommunication services. As demand for services changes, the number of VNF components can change as well. For example, if demand increases to a certain percentage of overall capacity for the VNF, an additional VNF component can be created to increase the overall capacity of the VNF. Conversely, if demand decreases below a certain percentage of overall capacity for the VNF, a VNF component can be removed. This frees up computing resources for other applications within the cloud computing environment.

It is desirable that telecommunication services exhibit a property referred to as high availability. A service that has high availability is available a high percentage of the time for a particular duration. For example, high availability may be defined as a service that is available 99.999% of the time. In order to provide high availability, various mechanisms are used to handle failures of the hardware or software that provides the service. In the case of hardware-based telecommunication services, additional pieces of hardware are used as backup in case a primary piece of hardware fails. However, use of NFV presents different challenges. Specifically, not only may one of the virtual machines fail, but a physical machine, which may support several virtual machines, may fail. This will cause each of the virtual machines being supported by that physical machine to fail. It is desirable that the VNF components that provide for NFV have mechanisms to handle failure of both virtual machines and physical machines in an efficient manner.

Methods and systems described herein provide efficient mechanisms for handling failure of both virtual machines and physical machines that provide the Network Function Virtualization Infrastructure (NFVI). According to one example of principles described herein, an NFV manager determines the number of virtual machines that are capable of supporting current demand for VNF services. Additionally the VNF manager determines the highest number of virtual machines being supported by a single physical machine. The VNF manager then determines a total number based on the number of virtual machines capable of supporting current demand and the number of virtual machines being supported by the physical machine that is supporting the most virtual machines.

For example, the VNF manager may determine that eight VNF components are sufficient to meet current demand for VNF services. Thus eight virtual machines, each running one of the eight VNF components, may be sufficient to provide for current demand. While it may be the case that each of those eight virtual machines is being supported by a different physical machine, it may also be the case that a single physical machine supports more than one of the eight virtual machines. For example, one physical machine may support four of the eight virtual machines. Additionally, the other physical machines may support two of the eight virtual machines. Thus, in order to handle the worst-case scenario in which the physical machine supporting four of the eight virtual machines fails, an extra four virtual machines, in addition to the original eight virtual machines, may be provisioned as well.

The cloud computing environments that support VNFs are dynamic and thus the largest number of virtual machines supported by a single physical machine may change over time. For example, as new virtual machines are provisioned to handle changes in demand for services, such new virtual machines may be provisioned on physical machines already supporting some of the virtual machines used by the VNF. This may increase the highest number of virtual machines being supported by a single physical machine. Conversely, as demand for VNF services decreases, virtual machines may be decommissioned, thus reducing the total number of virtual machine supported by a particular physical machine.

According to principles described herein, the number of extra virtual machines provisioned to account for the worst-case scenario may change in real time based on at least the change in the highest number of virtual machines supported by a single physical machine. Additionally, various other factors may be used to adjust the extra number of virtual machines provisioned as will be described in further detail below. Furthermore, as will also be described in further detail below, various redundancy models may be used in accordance with principles described herein.

FIG. 1 is a diagram showing network function virtualization 100. According to the present example, a Network Function Virtualization Infrastructure (NFVI) 102 is used to provide network function virtualization 100. The NFVI 102 provides the infrastructure for a number of VNFs 120. Both the VNFs 120 and the NFVI 102 are managed by a management and orchestration layer 140.

The NFVI 102 includes a set of physical resources 104 that are used to provide a set of virtual resources 112. The physical resources 104 include computing resources 106, storage resources 108, and network resources 110. Other resources, such as input/output resources are contemplated as well. The physical resources 104 are typically embodied as a plurality of physical computing systems, sometimes referred to as servers, within a datacenter. For example, a datacenter may include several servers that are positioned on racks and interconnected via physical network cables. Each of the servers includes hardware including a physical processor, a memory, and a network interface. Some servers may be designed primarily for processing power and some servers may be designed primarily for storage. In one example, the servers are commodity servers that include a number of physical processors, such as x86 processors. The servers utilize an operating system, such as Linux, to provide various applications with access to the hardware of the servers. More specifically, the operating system will schedule processing tasks on the physical processor of the server and allocate physical memory for use by the application.

The computing resources 106 include a plurality of processors within a plurality of physical computing systems. The processors are designed to process machine readable instructions to perform specifically designed tasks. The processors can be designed to work together to provide parallel processing capabilities.

The storage resources 108 include various types of memory. Some types of memory, such as non-volatile types of memory, typically have large storage volume but relatively slow performance. The storage resources 108 may include a series of hard disk drives or solid state drives that store data in the form of machine readable instructions as well as large amounts of data. The storage resources 108 may also include volatile forms of memory, such as those used for Random Access Memory (RAM), which are optimized for speed and are often referred to as "working memory."

The network resources 110 include the physical network infrastructure that provides communication between the physical computing systems as well as to an external network such as the Internet. The physical network infrastructure includes the physical cables, such as Ethernet or fiber optic, that connect the physical systems to routers, switches, and other networking equipment that provides the desired interconnectivity.

The physical resources 104 use hypervisors to provide a virtual computing environment that provides the virtual resources 112. Specifically, the hypervisors provide virtual hardware to guest operating systems. A physical computing system may provide one or more virtual machines for use by guest operating systems. The virtual resources 112 include virtual computing resources 114, virtual storage resources 116, and virtual network resources 118. Such virtual resources 112 may emulate their underlying physical resource counterparts.

The virtual computing resources 114 include virtual processors that execute machine readable instructions as a physical processor does. The hypervisor then maps the execution of those instructions to execution of instructions on a physical processor. The architecture of the virtual processor does not necessarily have to match the architecture of the underlying physical processor, which allows a variety of instruction set architectures to be used for various virtual machines.

The virtual storage resources 116 include short term and long term storage services. Specifically, the virtual machines may include virtual memory that is then mapped to physical memory by the hypervisor. There does not necessarily have to be a one-to-one mapping of virtual memory to physical memory. For example, two gigabytes of virtual working memory may be mapped to only one gigabyte of working memory in the physical system. Various paging techniques are then used to swap physical memory from working memory to a volatile storage memory to allow for such mapping.

Each virtual machine may run a guest operating system. The guest operating system may be similar to a host operating system. For example, the guest operating system may also be Linux. The guest operating system runs applications and provides such applications with access the virtual hardware of the virtual machines. For example, the guest operating system schedules processing tasks associated with the applications on the virtual processor. The guest operating system also provides the application with access to virtual memory associated with the virtual machines.

When the guest operating system provides applications running thereon with access to the virtual resources, the hypervisor of the underlying physical computing systems then maps those resources to the underlying physical resources. For example, when an application running on the guest operating system stores data in virtual memory, the hypervisor translates a virtual memory address into a physical memory address and the data is stored at that physical memory address. When the guest operating system schedules processing tasks for execution on the virtual processor, the hypervisor translates those processing tasks into executable instructions for the physical processor.

The virtual machines that are provided as part of the virtual resources 112 can be interconnected to each other through one or more virtual networks that make up the virtual networking resources 118. Such virtual networks emulate physical networks. Virtual networks may include a number of machines, both physical and virtual, that are assigned a virtual network address. The virtual networks can also isolate sets of virtual machines as desired. This can be helpful if some virtual machines are owned and/or operated by one entity and other virtual machines are owned and/or operated by another entity.

The NFVI 102 is managed by an infrastructure manager 124, which is part of the management and orchestration layer 140. The infrastructure manager 124 may operate under a set of pre-defined rules that instruct the infrastructure manager how to manage the NFVI 102. Such rules may be adjusted by a human operator as desired. For example, such rules may instruct the infrastructure manager 124 how to provision additional virtual machines when instructed to do so. The infrastructure manager 124 may include hardware, software, or a combination of both to perform various management functions. For example, the infrastructure manager 124 may be an application that resides on one or more physical machines and can receive input from human administrators as well as other management functions. The infrastructure manager 124 can then manage the physical and virtual environment as appropriate. For example, if it is determined that more virtual machines are desired, then the infrastructure manager 124 can send an instruction to the NFVI to create an additional virtual machine and configure it for use by whatever entity uses that virtual machine. Additionally, the infrastructure management can cause the physical computing systems to enter standby mode if less physical computing power is desired. The infrastructure manager 124 can also take such physical computing systems out of standby mode when more computing power is desired.

In the present example, the infrastructure manager 124 includes two components. Specifically, the infrastructure manager 124 includes a compute controller 130 and an SDN controller 132. The compute controller 130 is responsible for managing the cloud computing environment provided by the virtual resources 112 of the NFVI 102. For example, the compute controller 130 may be responsible for provisioning additional virtual machines within the cloud computing environment when instructed to do so. The compute controller 130 may have access to a set of pre-defined rules. Such rules may be configured and/or defined by a human administrator. Such rules may be stored as a data structure in physical memory. In one example, such rules may instruct the compute controller 130 how to tear down a virtual machine when instructed to do so. One example of a compute controller 130 includes the open-source cloud computing software platform provided by the Openstack Foundation under the name OpenStack™.

The SDN controller 132 is used to control the network resources of the NFVI 102. The SDN controller 132 may control both the physical network resources 110 and the virtual network resources 118. As will be described in further detail below, the SDN controller 132 receives instructions from various applications for how to configure the network infrastructure. The SDN controller 132 may have access to a set of pre-defined rules. Such rules may be configured and/or defined by a human administrator. Such rules may be stored as a data structure in physical memory. One example of a rule used by the SDN controller 132 may be how to establish virtual network connections when instructed to do so.

As described above, a VNF 120 represents a virtualization of specific telecommunication functions that are typically performed by specialized pieces of hardware. Examples of a VNF 120 include, but are not limited to, an SBC, an Internet Protocol (IP) Multimedia Subsystem (IMS) core, and a telephony application server. A VNF 120 may include a number of components, or instances of an application, that run within the virtual machine environment. Such applications are designed to emulate the specialized pieces of telecommunication hardware. Thus, instead of setting up a new physical piece of specialized equipment, a service provider can simply spin up a virtual machine environment and run applications. Each VNF 120 has a corresponding Element Management System (EMS) 122. The EMS 122 includes a user interface, or a dashboard, that allows an administrator to configure the VNF 120 as desired. To provide full NFV, several VNFs work together to provide the desired services. In the present example, a plurality of VNFs 120-1, 120-2 . . . 120-n and corresponding EMSs 122-1, 122-2 . . . 122-n are used to provide NFV.

An EMS 122 may have access to a set of pre-defined rules. Such rules may be configured and/or defined by a human administrator. Such rules may be stored as a data structure in physical memory. One example of a rule used by an EMS 122 may define what statistics should be collected regarding operation of the VNF 120.

A VNF 120 typically includes several different components, which may or may not be identical, that together form the full VNF 120. For example, the different components may be different instances of the VNF application. The different instances then work together to provide the functionality of the full VNF 120. Multiple VNFs 120 are then used in concert to provide a telecommunication network for a telecommunication service. A telecommunications network is an infrastructure that provides communication services between multiple subscribers. One example of a communication service is a Voice over IP (VoIP) service. Such services typically include several pieces of specialized hardware that perform specific network functions. However, according to principles described herein, the VNF 120 provides such functions instead of a specialized piece of hardware.

A VNF 120 may be part of a telecommunications core network. The core network is the central part of a telecommunications networks. The core network provides various communication services to the subscribers such as voice communication. Subscribers are connected to the core network through an access network, which will be described in further detail below. According to principles described herein, the VNF component can communicate with the core network over a first network and communicate with the access network over a second network. The first network is isolated from the second network such that communication between the VNF and the core network does not traverse the same physical network components as the communication between the VNF and the access network.

The VNFs 120 are managed by a VNF manager 126, which is part of the management and orchestration layer 140. In some cases, there may be multiple VNF managers 126, each managing one or more specific VNFs 120. The VNF manager 126 can manage the VNFs based on network demand. For example, at peak times, the VNF manager 126 can start up new instances of VNF components to scale dynamically according to demand. While there may be several VNF managers 126, there is a single orchestrator 128 that manages the VNF managers 126 and thus manages the entire NFV service. The VNF manager 126 may have access to a set of pre-defined rules. Such rules may be configured and/or defined by a human administrator. Such rules may be stored as a data structure in physical memory. One example of a rule used by the VNF manager 126 may be when to instruct the compute controller 130 to provision an additional virtual machine. For example, when demand for services reaches a certain threshold of capacity, the VNF manager 126 can instruct the compute controller to provision an additional virtual machine so that an additional VNF component can be provisioned.

Figure 2:
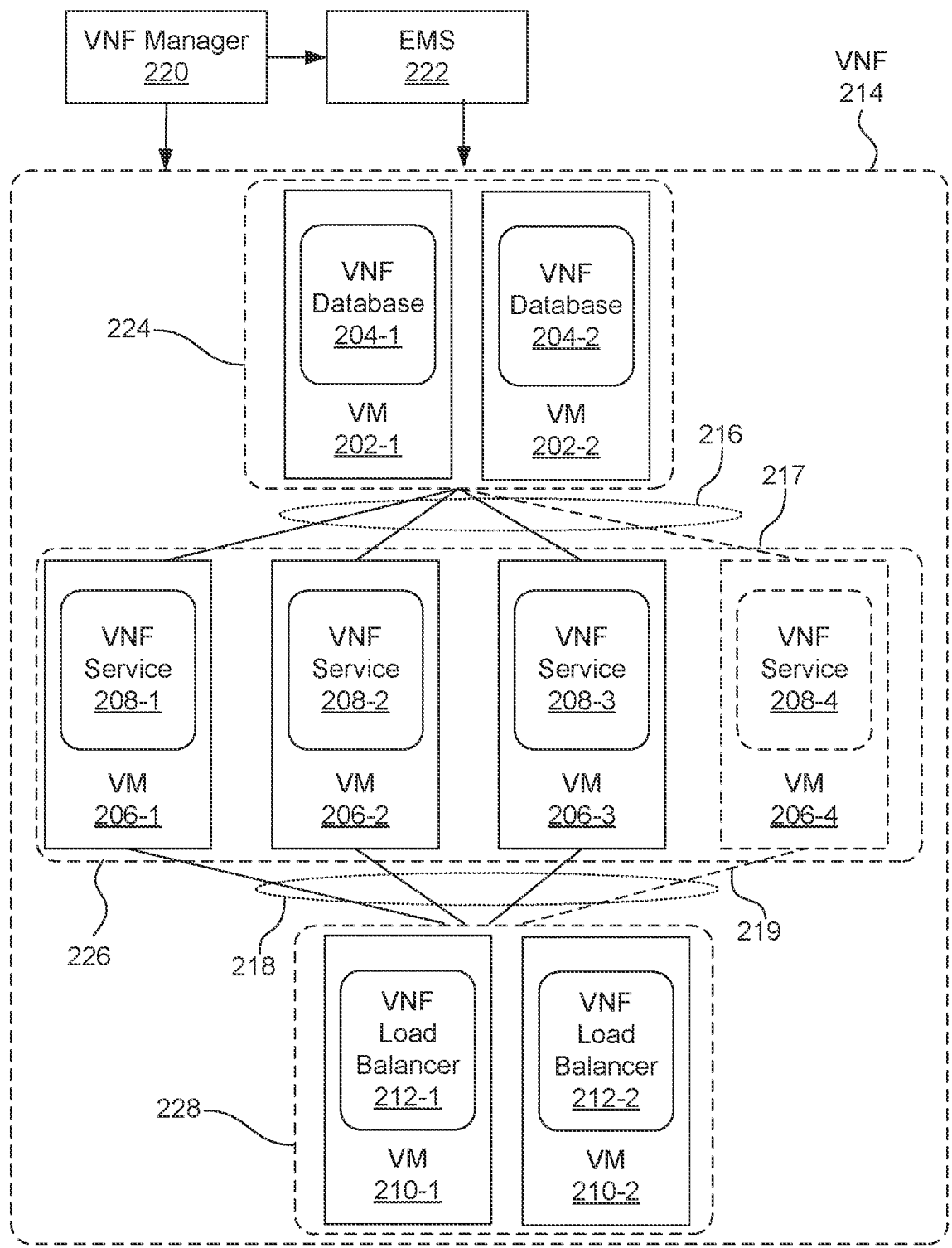
FIG. 2 is a diagram showing VNF components, according to one example of principles described herein.

FIG. 2 is a diagram showing various VNF components. According to the present example, a VNF 214 is managed by a VNF manager 220. The VNF manager 220 is in communication with an EMS 222. The VNF manager 220 corresponds to the VNF manager 126 described above. The VNF 214 includes a number of VNF components 204, 208, 212. In the present example, there are different types of VNF components 204, 208, 212, grouped into different clusters. Specifically, a database cluster to 24 includes a plurality of database components 204-1, 204-2. A service cluster 226 includes a plurality of service components 208-1, 208-2, 208-3, 208-4. The load balancer cluster 228 includes a plurality of load balancer components 212-1, 212-2. Each VNF component 204, 208, 212 may run on a different virtual machine 202, 206, 210. While the present example illustrates the case where there are three different types of VNF service components, other examples may include a different grouping of VNF components.

In the present example, the database components 204-1, 204-2 run on virtual machines 202-1, 202-2. The database components 204-1, 204-2 store a variety of data that is used by other VNF components. For example, the database components 204-1, 204-2 may include subscriber related data for at least a subset of the subscribers of the telecommunication service associated with the VNF 214. In some examples, one of the database components 204 may be a real-time cache to store real time data used by the service components 208. Thus, if one of the service components 208 fails, another service component can readily take over for the failed service component 208. The database components 204-1, 204-2 are connected to the service components 208 through connections 216. The connections 216 are part of a virtual network associated with the VNF 214.

In the present example, the load balancer components 212-1, 212-2 run on virtual machines 210-1, 210-2. The load balancer components 212-1, 212-2 balance the workload of the VNF 214 between the service component instances 208-1, 208-2, 208-3, 208-4. The load balancer components 212-1, 212-2 may also act as an access point between the core network to which the VNF 214 belongs and the access network. The access network is the part of a telecommunications network that connects a subscriber's communication device (e.g., a phone, cellular phone, or computer) to the core network. The load balancer components 212-1, 212-2 are connected to the service components 208-1, 208-2, 208-3, 208-4 through connections 218. The connections 218 are part of the virtual network associated with the VNF 214.

In the present example, there are three service component instances 208-1, 208-2, 208-3. Service component instance 208-1 runs on virtual machine 206-1. Service component instance 208-2 runs on virtual machine 206-2. Service component instance 208-3 runs on virtual machine 206-3. The service component instances 208-1, 208-2, 208-3 perform the primary servicing functions of the VNF 214. Thus, when more subscribers are using the telecommunication service associated with the VNF 214, a greater percentage of the capacity of the VNF 214 becomes fuller.

According to one example, when utilization of the VNF 214 exceeds a certain percentage of total capacity, the VNF

214 may scale to handle the additional demand for services. For example, if the VNF 214 reaches 80 percent of total capacity, the VNF 214 can start up an additional service component instance 208-4 to increase the total capacity of the VNF 214. Conversely, if the utilization of capacity drops below a defined threshold, such as 50 percent, then one of the service component instances 208 can be decommissioned.

When a new virtual machine 206-4 is created for the purpose of running a new VNF component 208-4, new connections 217, 219 are established to connect that new virtual machine 206-4 to virtual machines 202, 210 from the other clusters 224, 226. These connections are established by the SDN controller (e.g. 132, FIG. 1) at the request of the VNF manager (e.g. 126, FIG. 1). The automatic establishment of the connections 217, 219 through use of the SDN controller allows for the elasticity of the VNF 214 to be performed more efficiently. This consumes fewer resources and thus allows the underlying physical systems to operate more efficiently.

Having more VNF components than needed can be advantageous for a variety of reasons. One of those reasons is fault tolerance. If any of the virtual machines running those VNF components fails, then one of the additional virtual machines can take over for the failed virtual machine. It is desirable to have enough extra virtual machines provisioned to handle the worst-case scenario failure while at the same time consuming as few computing resources as possible.

Figure 3A:
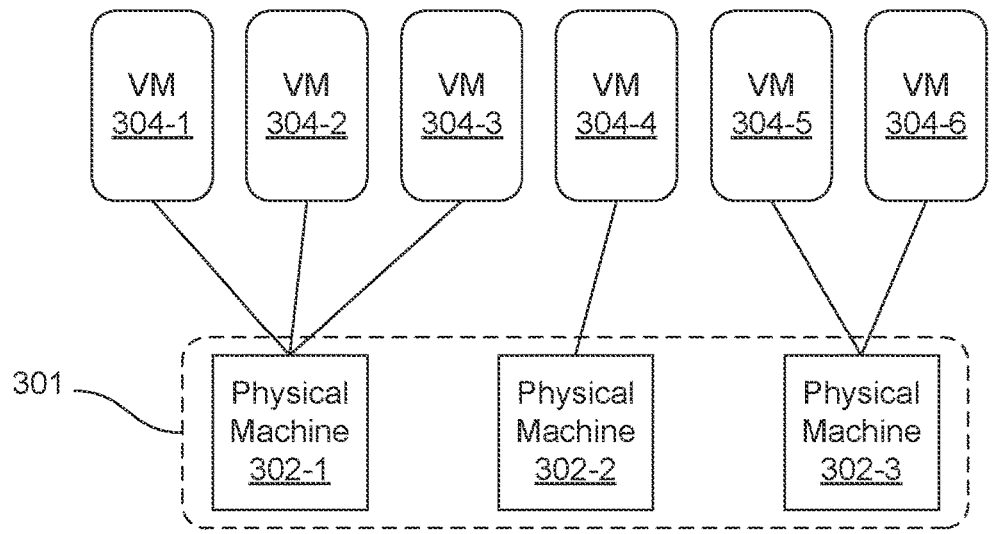
FIGS. 3A and 3B are diagrams showing illustrative over-allocation of virtual machines, according to one example of principles described herein.
Figure 3B:
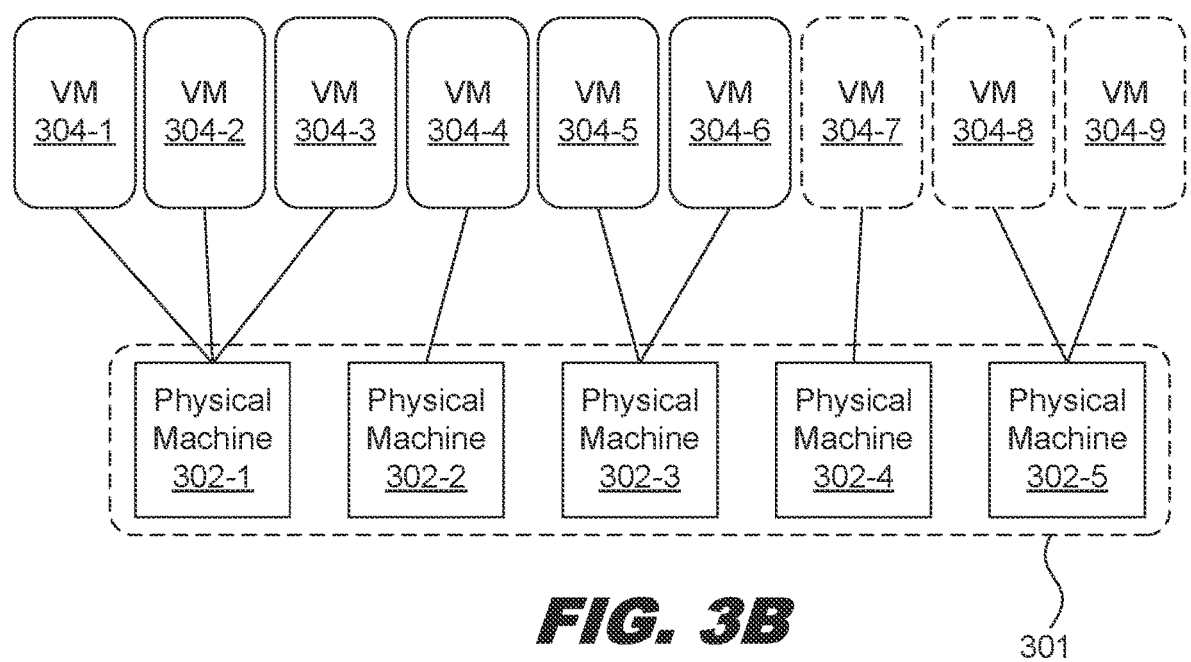

FIGS. 3A and 3B are diagrams showing illustrative overallocation of virtual machines. According to the present example, a set 301 of physical machines 302 is used to support a plurality of virtual machines 304. Each of the virtual machines 304 includes a VNF component for a particular VNF. As described above, the number of virtual machines 304 used for a particular VNF may scale according to changes in demand for service. In the present example, each the virtual machines illustrated in FIG. 3A are deemed sufficient to support current demand for services. But, to handle potential faults it is desirable that additional virtual machines be provisioned. Using principles described herein, the number of additional virtual machines to be provisioned is determined. In some examples, the virtual machines 304 may correspond to the service VNF components (e.g., 208, FIG. 2) described above. In some examples, however, the virtual machine 304 may correspond to different types of VNF components such as the load balancer components (e.g., 212, FIG. 2).

In one example, the total number of virtual machines 304 to be provisioned is defined as N+M. N represents the number of virtual machines 304 deemed sufficient to meet current demand for services. M represents the highest number of virtual machines 304 assigned to a single physical machine 302. In the present example, virtual machines 304-1, 304-2, and 304-3 are supported by physical machine 302-1. Virtual machine 304-4 is supported by physical machine 302-2. Virtual machines 304-5, 304-6 are supported by physical machine 302-3. Thus, in this case M is three because the highest number of virtual machines 304 supported by a single physical machine 302-1 is three. Also, in the present example, N is six because each of the virtual machines 304-1, 304-2, 304-3, 304-4, 304-5, and 304-6 are deemed sufficient to meet current demand.

The value N may be defined in a variety of manners. In one example, N may be the minimum number of virtual machines that are required to handle current demand for services. In some examples the value N may be the minimum number of virtual machines that are required to handle current demand for services plus a buffer number of virtual machines. For example, it may be the case that the minimum number of virtual machines required to meet current demand is four. Additionally, it may be the case that the VNF manager defines a buffer, such as two. Thus, the VNF manager may define N as six (i.e, four+two).

In some examples, N may be subject to a set of constraints. For example, the VNF manager may define a minimum number of virtual machines that are to be provisioned at a given time. For example, if three is the defined minimum, then there will always be at least three virtual machines provisioned for the VNF even if demand for services drops to a level that can be handled by less than three virtual machines. Other constraints are contemplated as well.

The value M may also be adjusted by a variety of factors. For example, M may be adjusted based on environmental factors such as processor utilization, network utilization, or other factors. Specifically, the current utilization of processors of the physical machines 302 support virtual machines 304 exceeded predefined threshold, then the VNF manager may increment the value of M. Similarly, if network traffic on the network that connects the physical machines exceeds a predefined threshold, then the VNF manager may increment the value of M. In other words, if the utilization of the network exceeds a predefined threshold, then the VNF manager may increment the value of M. Conversely, if processor utilization or network traffic drops below specified thresholds, then the VNF manager may decrement the value of M. In some examples, M may be based on the number of subscribers that are currently using the telecommunication service associated with the VNF.

The value M may be subject to a set of constraints. For example, and may have a defined minimum and/or defined maximum. If, for example, the VNF manager sets a defined minimum of two for the value of M, then M will not drop below two even if each virtual machine is supported by different physical machine 302. If, for example, the VNF manager defines a maximum of ten for the value of M, then M will not exceed ten even if a single physical machine is supporting more than ten virtual machines. Other constraints for the value of M are contemplated as well.

FIG. 3B illustrates the provisioning of additional virtual machines 304-7, 304-8, 304-9 so that the total number of virtual machines (i.e, 9) is equal to N (i.e., 6)+M (i.e, 3). In the present example, the additional virtual machines 304-7, 304-8, 304-9 are provisioned on additional physical machines 302-4, 302-5. Specifically, virtual machine 304-7 is supported by physical machine 302-4. Virtual machines 304-8, 304-9 are supported by physical machine 302-5.

In one example, the additional virtual machines 304-7, 304-8, 304-9 may be provisioned in response to an instruction from the VNF manager. Specifically, the VNF manager may determine the values of both N and M. The VNF manager may also determine the number of currently provisioned virtual machines. If N+M is different than the number of currently provisioned virtual machines, then the VNF manager can instruct NFVI infrastructure to either provision an additional virtual machine or decommission a currently provisioned virtual machine.

Each of the N and M virtual machines may be used according to various redundancy models. One example of a redundancy model is an active/active model. In an active/active model, each of the virtual machines, including the virtual machines above what is deemed to be sufficient for current demand, actively provides services. If one or more of the virtual machines 304 fails, then the other active virtual machines 304 can take over processing the services that were being provided by the failed virtual machines.

Another example of a redundancy model is an active/standby model. Such a model is sometimes referred to as an n+1 model. In an active/standby model, the N virtual machines 304 actively provide services while the M virtual machines 304 are idle, or in other words, are on standby. For example, in the scenario illustrated in FIG. 3B, six of the nine virtual machines 304 may be designated as active virtual machines while three of the nine virtual machines 304 may be designated as standby virtual machines 304. In some examples, the specific virtual machines 304 that are designated as active or standby is not static. For example, any one of the nine virtual machines three or four may be designated as an active virtual machine and any one of the nine virtual machines 304 may be designated as a standby virtual machine.

In some examples, M is dynamic. During normal operations, as demand for services change, the VNF scales up and down accordingly. Specifically, additional virtual machines may be provisioned, or currently provisioned virtual machines may be decommissioned. As this happens, the highest number of virtual machines being supported by a single physical machine may change. Thus, the value M may be updated in real time based on such changes.

In some examples, the VNF manager may maintain the values of N and M within a data structure. The values of N and M within such a data structure may be updated periodically. In some cases, the values of N and M may also be updated in response to changes that may affect the values of N and M.

Figure 4A:
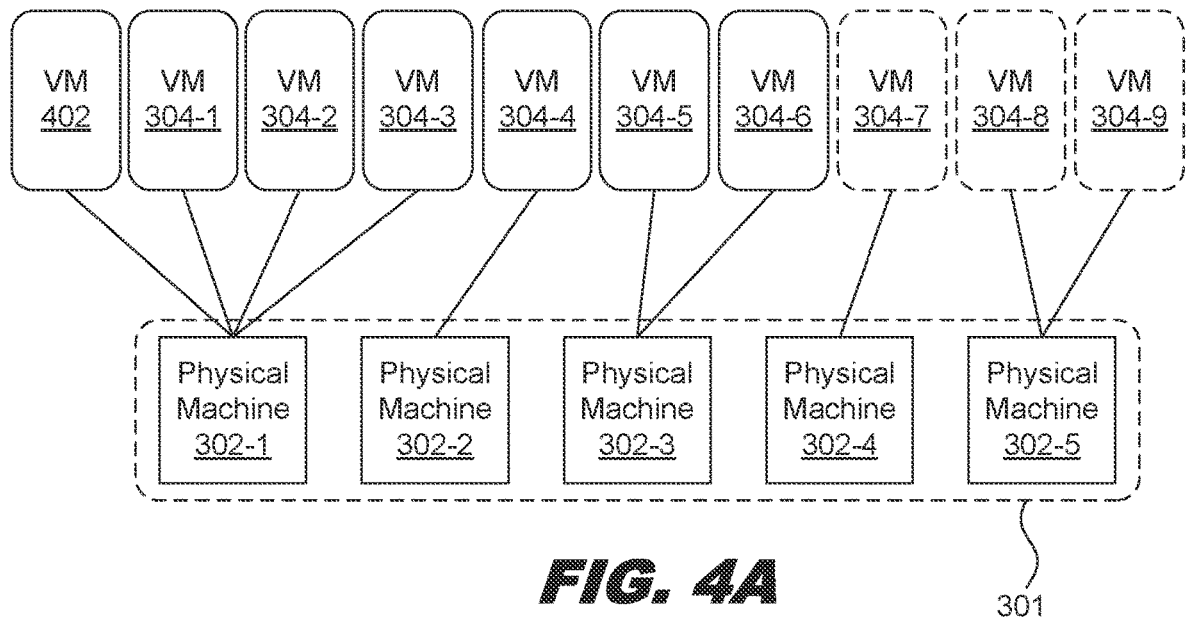
FIGS. 4A and 4B are diagrams showing illustrative provisioning of virtual machines in response to a change in worst-case-scenario, according to one example of principles described herein.
Figure 4B:
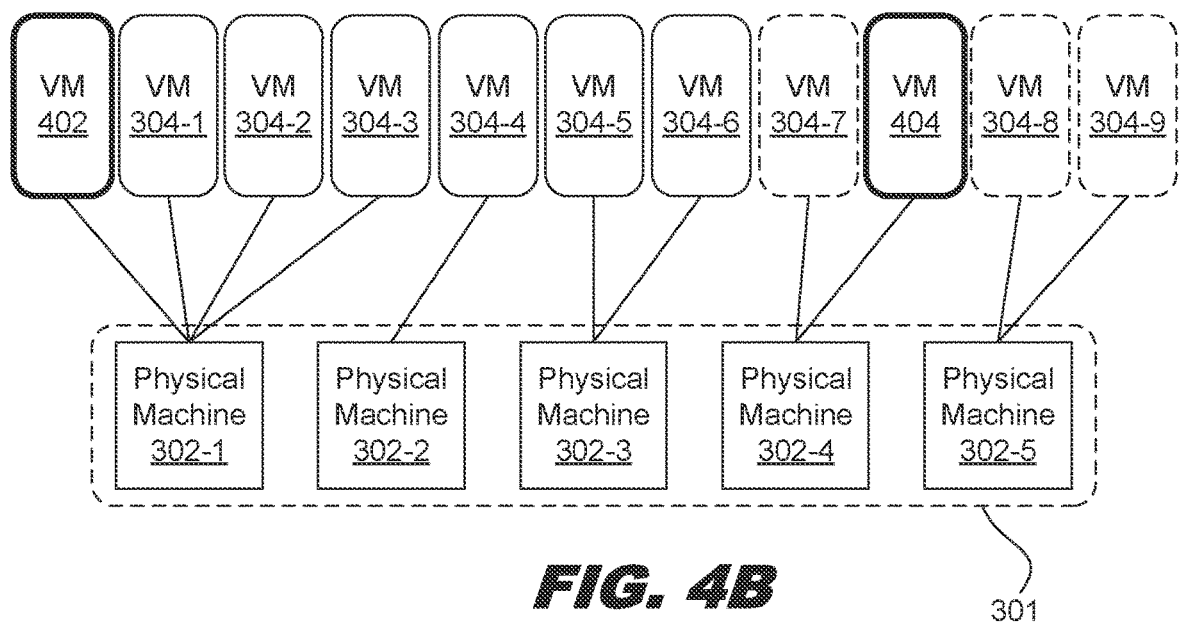

FIGS. 4A and 4B are diagrams showing illustrative provisioning of virtual machines in response to a change in worst-case-scenario. According to the present example, as illustrated in FIG. 4A, an additional virtual machine 402 has been added to physical machine 302-1. The additional virtual machine may be provisioned for a variety of reasons. For example, the VNF manager (e.g., 126, FIG. 1) may determine that due to additional demand for services, an additional virtual machine should be provisioned. The VNF manager 126 may then instruct the infrastructure manager (e.g., 124, FIG. 1) to provision the additional virtual machine 402. The infrastructure manager 124 may then determine which physical machine 302 should handle the additional virtual machine 402. The infrastructure manager may make this decision based on a variety of factors which are outside the scope of the present discussion.

In the present example, the infrastructure manager 124 determines that physical machine 302-1 will support the new virtual machine 402. Physical machine 302-1 now supports four virtual machines. Because the highest number of virtual machine supported by a single physical machine is now four instead of three, and is updated from three to four. The VNF manager 126 may then instruct the infrastructure manager 124 to provision another virtual machine in response to the change in the value of M.

FIG. 4B illustrates another virtual machine 404 that has been provisioned in response to the change in the value of M. The new virtual machine 404 may be added to any one of the physical machines 302. In some examples, the infrastructure manager 124 determines which physical machine 302 to support the new virtual machine 404. In some examples, it may be the case that the new virtual machine 404 is added to physical machine 302-1. In such a case, the value of M would be further incremented, thus causing the VNF manager 126 to instruct the infrastructure manager 124 to provision another virtual machine (not shown).

Figure 5A:
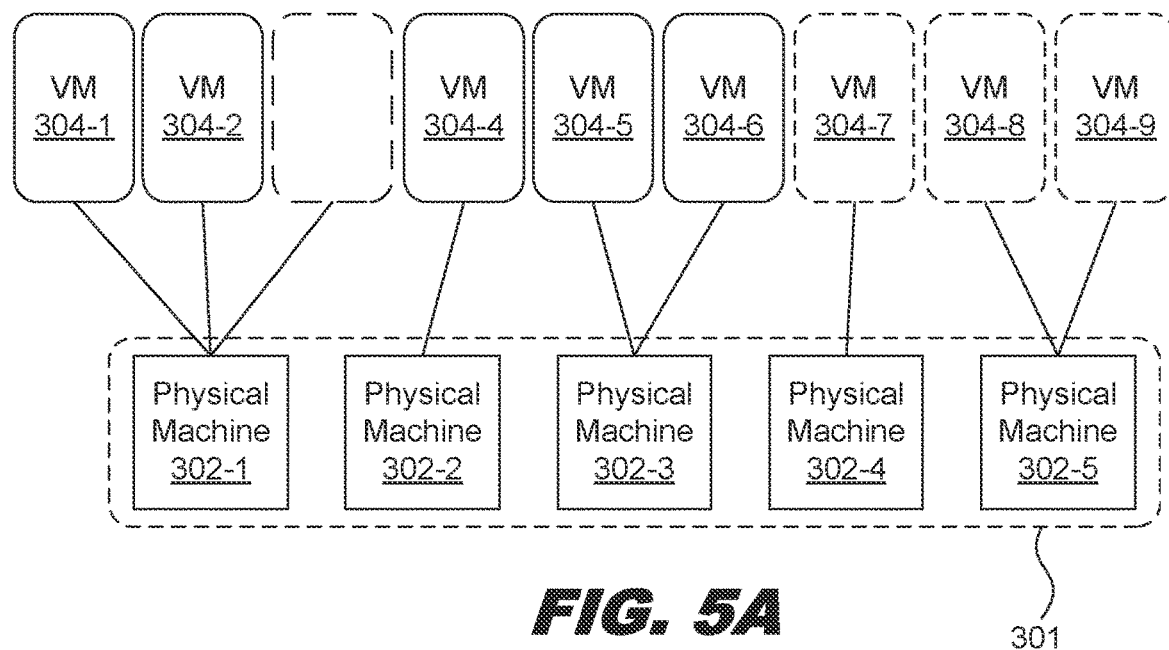
FIGS. 5A and 5B a diagram showing illustrative decommissioning of virtual machines in response to a change in worst-case-scenario, according to one example of principles described herein.
Figure 5B:
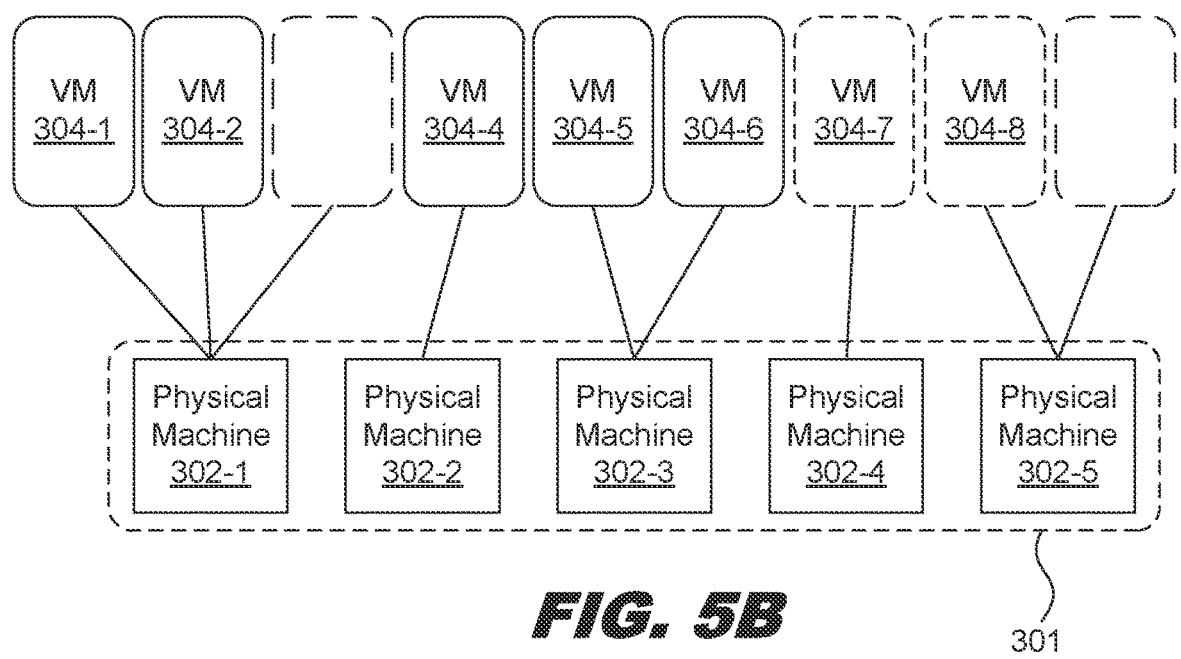

FIGS. 5A and 5B a diagram showing illustrative decommissioning of virtual machines in response to a change in worst-case-scenario. According to the present example, as illustrated in FIG. 5A, one of the virtual machines 304 being supported by physical machine 302-1 has been decommissioned. A virtual machine may be decommissioned for a variety of reasons. For example, the VNF manager (e.g., 126, FIG. 1) may determine that due to a reduction in demand for services, one of the virtual machines 304 should be decommissioned to free up computing resources for other applications. The VNF manager 126 may then instruct the infrastructure manager (e.g., 124, FIG. 1) to decommission one of the virtual machines 304. The infrastructure manager 124 may then determine which virtual machine 304 should be decommissioned. The infrastructure manager 124 may make this decision based on a variety of factors which are outside the scope of the present discussion.

In the present example, one of virtual machines 304 being supported by physical machine 302-1 is decommissioned. Physical machine 302-1 now supports only two virtual machines 304. Because the highest number of virtual machines being supported by a single physical machine 302 is now two instead of three, the value of M is decreased from three to two. Because M has been reduced, the VNF manager 126 instructs the infrastructure manager 124 to decommission another one of the virtual machines. In the present example, virtual machine 304-9 is decommissioned. However, any one of the virtual machines 304 may be decommissioned.

Using principles described herein, a VNF uses a minimum amount of computing resources while being prepared to handle failure of any of the physical machines 302 supporting the virtual machines 304 associated with the VNF. In other words, there is an over-allocation of virtual machines that are used to support the VNF. This over-allocation allows a service provider to provide a telecommunication service that is less likely to be interrupted due to equipment failures. Thus, when a subscriber is using the telecommunication service and a physical machine involved with the service fails, thus causing multiple virtual machines providing the service to fail, the call can be processed by a different virtual machine. The subscriber may be entirely unaware of such failure. Additionally, the number of over-allocated virtual machines may change in real time based on changes in N and M as described above. This improves the operational efficiency of the VNF and the physical and virtual infrastructure that supports the VNF.

Figure 6:
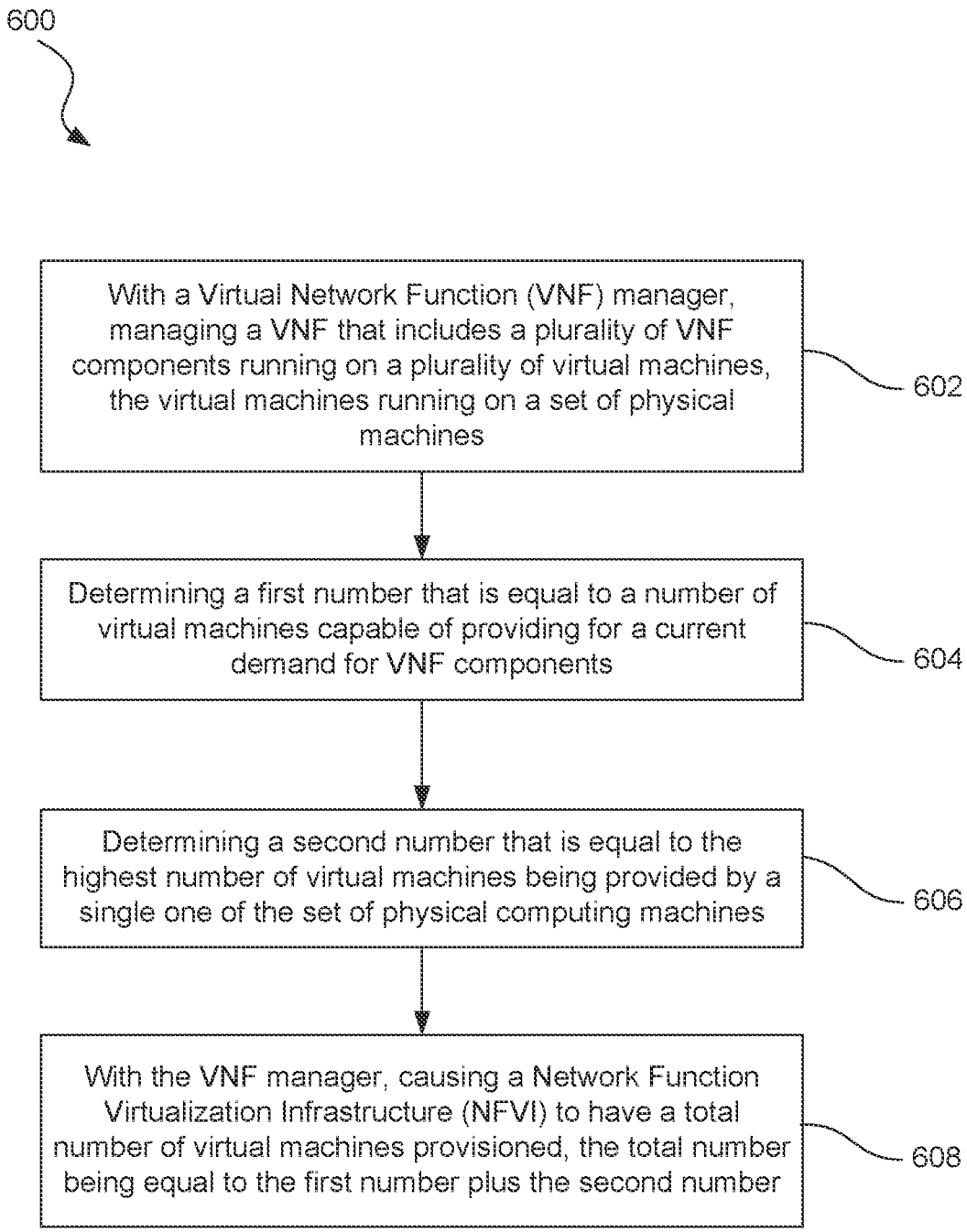
FIG. 6 is a flowchart showing an illustrative method for providing redundancy in a high-availability NFV telecommunication service, according to one example of principles described herein.

FIG. 6 is a flowchart showing an illustrative method for providing redundancy in a high-availability NFV telecommunication service. According to the present example the method 600 includes a step 602 for, with a VNF manager, managing a VNF that includes a plurality of VNF components running on a plurality of virtual machines, the virtual machines running on a set of physical machines. In one example, each VNF component is run on a separate virtual machine. Additionally, varying numbers of virtual machines may run on a single one of the physical machines. The VNF may provide telecommunication services in a virtualized computing environment. As demand for those services changes, the number of VNF components that make up the VNF may change as well. Specifically, new VNF components may be set up on newly provisioned virtual machines in response to increasing demand for services. Conversely VNF components and their respective virtual machines may be decommissioned in response to decreasing demand for services.

The VNF manager may be embodied as a computer application that includes a set of machine readable instructions for execution on a processor. The computer application that forms the VNF manager may be stored on a server or other form of non-transitory storage media that is accessible to computing system that executes the computer application.

According to the present example, the method 600 includes a step 604 for determining a first number that is equal to a number of virtual machines capable of providing for current demand for VNF components. Step 604 may be performed by the VNF manager. The first number corresponds to the number N described above. In other words, the first number is the number of virtual machines deem sufficient to meet current demand for services. As described above the number of virtual machines deemed sufficient to meet current demand to be defined in a variety of matters.

According to the present example, the method 600 includes a step 606 for determining a second number that is equal to the highest number of virtual machines being provided by a single one of the set of physical computing machines. Step 606 may be performed by the VNF manager. The second number corresponds to the number M described above. In other words, the second number represents the number of virtual machines above the number deemed sufficient to meet current demand for services. By having this number be equal to the highest number of virtual machines being provided by a single one of the set of physical computing machines, the VNF is capable of handling a situation in which that physical machine which supports the highest number of virtual machines fails.

According to the present example, the method 600 includes a step 608 for, with the VNF manager, causing the NFVI to have a total number of virtual machines provisioned, the total number being equal to the first number plus the second number. In other words, the total number of virtual machines being provisioned for the VNF is N plus M. The VNF manager may cause the NFVI to have the appropriate number of virtual machines provisioned by instructing the infrastructure manager to provision new virtual machines or decommission currently provisioned virtual machines. For example, if N plus M is more than the current number of provisioned virtual machines, then the VNF manager can instruct the infrastructure manager to commission an additional virtual machine and have that additional virtual machine running new instance of a VNF component. Conversely, if N plus M is less than the current number of provisioned virtual machines, then the VNF manager can instruct infrastructure manager to decommission one of the currently provisioned virtual machines. Thus the VNF component being run on the decommissioned virtual machine is taken out of service to free up virtual and physical computing resources. Furthermore, as N or M changes in real time, the VNF manager may cause additional virtual machines to be commissioned or provisioned virtual machines to be decommissioned so that the total number of virtual machines provisioned matches the new N plus M. The steps described above may be performed by the VNF manager. In some examples, other applications or systems may perform the steps described above. In such examples, such other applications or systems may communicate with the VNF manager.

A system that is updated in real-time is updated on a timescale that is perceptible to a human administrator as being instantaneous or nearly instantaneous. While it may take a small amount of time, such as a few minutes, to instantiate or decommission a virtual machine, updating the values of N and M may occur relatively quickly and thus be, by human perception, in real time.

Again, using principles described herein, a VNF uses a minimum amount of computing resources while being prepared to handle failure of any of the physical machines supporting the virtual machines associated with the VNF. Thus, principles described herein provide a solution to problems that are specific to VNFs. Particularly, determining the number of virtual machines to be over-allocated when several of those virtual machines run on a single physical machine, which may fail at some point, is a problem that is specific to providing a high-availability telecommunication service using applications that run in virtual computing environment. By considering the highest number of virtual machines being supported by a single physical machine when determining the number of virtual machines to be over-allocated, the worst-case physical machine failure can be accounted for while using an efficient amount of resources. Additionally, the number of over-allocated virtual machines may change in real time based on changes in N and M as described above. This improves the operational efficiency of the VNF and the physical and virtual infrastructure that supports the VNF. Moreover, it allows the service provider to provide a telecommunication service with high availability. In other words, failure of particular physical machine will not interrupt services that are currently being provided to subscribers.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
 managing a VNF that includes a plurality of Virtual Network Function (VNF) components running on a plurality of virtual machines, the virtual machines running on a plurality of physical computing machines;
 maintaining N+M redundancy, including determining a first number (M) of virtual machines equal to a highest number of virtual machines provided by a single one of the plurality of physical computing machines for the VNF;
 causing a total number of virtual machines to be provisioned, the total number being equal to a second number (N) of virtual machines capable of providing for a current demand for VNF components plus the first number (M);

causing an additional virtual machine to be provisioned on the single one of the plurality of physical computing machines, including increasing the first number (M); and detecting an increase in the first number (M) and, in response, adjusting the second number (N) of virtual machines provisioned.

2. The method of claim 1, wherein causing the additional virtual machine to be provisioned is based on current utilization of a network associated with the VNF.

3. The method of claim 1, wherein herein causing the additional virtual machine to be provisioned is based on utilization of processors of the plurality of physical computing machines.

4. The method of claim 1, wherein causing the additional virtual machine to be provisioned is based on a number of subscribers currently using a telecommunication service associated with the VNF.

5. The method of claim 1, wherein the total number of virtual machines uses an active/active model.

6. The method of claim 1, wherein the total number of virtual machines uses an active/standby model.

7. The method of claim 1, further comprising:
provisioning a second additional virtual machine on an additional physical computing machine in response to detecting the increase in the first number (M).

8. A method comprising:
managing a VNF that includes a plurality of Virtual Network Function (VNF) components running on a plurality of virtual machines, the virtual machines running on a plurality of physical computing machines;

maintaining N+M redundancy, including determining a first number (M) of virtual machines equal to a highest number of virtual machines provided by a single one of the plurality of physical computing machines for the VNF;

causing a total number of virtual machines to be provisioned, the total number being equal to a second number (N) of virtual machines capable of providing for a current demand for VNF components plus the first number (M);

causing one of the virtual machines to be deprovisioned on the single one of the plurality of physical computing machines, including decreasing the first number (M); and detecting a decrease in the first number (M) and, in response, adjusting the second number (N) of virtual machines provisioned.

9. The method of claim 8, wherein adjusting the second number (N) of virtual machines comprises:
causing an additional one of the virtual machines to be deprovisioned on one of the physical computing machines different from the single one of the plurality of physical computing machines.

10. The method of claim 8, wherein causing one of the virtual machines to be deprovisioned is based on current utilization of a network associated with the VNF.

11. The method of claim 8, wherein herein causing one of the virtual machines to be deprovisioned is based on utilization of processors of the plurality of physical computing machines.

12. The method of claim 8, wherein causing one of the virtual machines to be deprovisioned is based on a number of subscribers currently using a telecommunication service associated with the VNF.

13. The method of claim 8, wherein the total number of virtual machines uses an active/active model.

14. The method of claim 8, wherein the total number of virtual machines uses an active/standby model.

15. A system comprising:
a processor; and
a memory comprising machine readable instructions that when executed by the processor, cause the system to perform a method of maintaining N+M redundancy of a Virtual Network Function (VNF) that includes a plurality of VNF components running on a plurality of virtual machines, the method including:

managing the VNF, wherein the virtual machines run on a plurality of physical computing machines;

determining a first number (M) of virtual machines equal to a highest number of virtual machines provided by a single one of the plurality of physical computing machines for the VNF;

causing a total number of virtual machines to be provisioned, the total number being equal to a second number (N) of virtual machines capable of providing for a current demand for VNF components plus the first number (M);

causing an additional virtual machine to be provisioned on the single one of the plurality of physical computing machines, including increasing the first number (M); and detecting an increase in the first number (M) and, in response, adjusting the second number (N) of virtual machines provisioned.

16. The system of claim 15, wherein the VNF comprises a Session Border Controller (SBC).

17. The system of claim 15, wherein causing the additional virtual machine to be provisioned is based on current utilization of a network associated with the VNF.

18. The system of claim 15, wherein herein causing the additional virtual machine to be provisioned is based on utilization of processors of the plurality of physical computing machines.

19. The system of claim 15, wherein causing the additional virtual machine to be provisioned is based on a number of subscribers currently using a telecommunication service associated with the VNF.

20. The system of claim 15, wherein adjusting the second number includes:
provisioning a second additional virtual machine on an additional physical computing machine in response to detecting the increase in the first number (M).

* * * * *